United States Patent [19]

Davidson et al.

[11] Patent Number: 4,702,137
[45] Date of Patent: Oct. 27, 1987

[54] AUTOMATIC BAND-SAW SYSTEM

[75] Inventors: Delma Davidson, Batesville; Thomas R. Waechter, Oldenburg, both of Ind.

[73] Assignee: Pallet Master, Inc., Fridley, Minn.

[21] Appl. No.: 767,623

[22] Filed: Aug. 20, 1985

[51] Int. Cl.⁴ .............................................. B27B 29/08
[52] U.S. Cl. .................................... 83/718; 83/435.1; 83/558; 83/730; 83/731; 83/820
[58] Field of Search .................. 83/558, 556, 554, 563, 83/820, 707, 713-731, 435.1

[56] References Cited

U.S. PATENT DOCUMENTS

| | | | |
|---|---|---|---|
| 2,445,676 | 7/1948 | Lasar | 83/716 X |
| 2,450,601 | 10/1948 | Lasar | 83/435.1 |
| 2,530,880 | 11/1950 | Hermann | 83/715 |
| 2,625,965 | 1/1953 | Crane | |
| 3,059,516 | 10/1962 | Cleland et al. | 83/201 |
| 3,077,132 | 2/1963 | Whitmore | 83/201 |
| 3,374,816 | 3/1968 | Alich | |
| 3,548,542 | 12/1970 | Young et al. | 51/5 |
| 3,906,829 | 9/1975 | Westfall | 83/716 X |
| 4,262,565 | 4/1981 | Pedi | 83/717 X |
| 4,454,795 | 6/1984 | Ellis | 83/820 |
| 4,505,176 | 3/1985 | Hamel | 83/808 |

FOREIGN PATENT DOCUMENTS

| | | | |
|---|---|---|---|
| 2902216 | 8/1979 | Fed. Rep. of Germany | 83/820 |
| 132529 | 5/1949 | United Kingdom | 83/722 |

OTHER PUBLICATIONS

Brochure entitled "PBR Power Band Rip Saw" of Wadkin Bursgreen of Greensboro, N.C. and San Jose, Calif.

Brochure entitled "Band Headrig Type VQ" of Stenner of Tiverton Ltd. of Devon, England.
Brochure entitled "Bandsaw" of Pinheiro, apparently marketed by Auburn Machinery, Inc., of Auburn, Me.

Primary Examiner—E. R. Kazenske
Assistant Examiner—Hien H. Phan
Attorney, Agent, or Firm—Willian Brinks Olds Hofer Gilson & Lione

[57] ABSTRACT

A band-saw-cutting system for cutting sections from a work in a substantially continuous, automated manner. The system includes a work carrier adapted to support one or more pieces of work and to be reciprocated to carry the work from a home position to a forward position in a cutting stroke to cut the work and back to the home position in a return stroke. The system includes blade-moving means for automatically moving the blade out of the cutting plane of the blade during each return stroke such that the work will not contact and rub against the blade during the return stroke, and for moving the blade back into the cutting plane prior to the initiation of the next cutting stroke. The system further includes means for automatically moving the work transversely against an adjustable fence to position the work relative to the cutting plane to cut desired thicknesses from the work during each cutting stroke. The fence includes means for insuring that the work is properly aligned with the cutting plane before a cutting stroke can be initiated. The system also includes a work-engaging means for holding the work during the cutting and return strokes and means for easily and quickly adjusting the tension on the cutting blade or to replace the blade. The invention permits a band-saw system to be utilized to cut work automatically with a high cutting rate and with minimal operator involvement.

16 Claims, 11 Drawing Figures

AUTOMATIC BAND-SAW SYSTEM

This invention relates to a new band-saw system to continuously and automatically cut wood into variable, predetermined thicknesses.

BACKGROUND OF THE INVENTION

In the past, inexpensive wooden articles, such as disposable shipping pallets, have been manufactured with the use of a gang saw capable of cutting four to eight slats for the upper surface of the wooden shipping pallet on each pass of the lumber through the gang saw. Because they permit a plurality of pallet slats to be cut simultaneously during each pass, gang saws permit a reduction in the labor required in cutting lumber for the pallet.

The reduction of labor obtained through the use of a gang saw is not without its price, however. Gang saws are expensive and require substantial electric power to drive the multiple saw blades. The high peak electrical demand required in starting the large motors needed to drive the multiple blades of the gang saw requires the payment of peak-demand penalties for electric power; and the high power demand of such motors requires that the plant facilities be wired with 440 three-phase service and other uncommon electrical services necessitated by such high-power equipment.

Furthermore, gang saws are wasteful of lumber. The gang-saw blades typically produce a kerf on the order of 0.200 to 0.250 inch, turning as much as thirty percent of the lumber being cut into sawdust. This wasteful production of large quantities of sawdust presents significant waste disposal and fire safety problems. In addition, where irregularities in the wood, such as knots, voids, and splits, occur, the gang saw will frequently break the boards being cut which is also a significant waste. The high initial cost and high operating cost have prevented the use of gang saws by many small manufacturers.

Band saws are desirable wood-cutting means. They are not wasteful of wood because their teeth produce only a small kerf, for example, 0.030 to 0.050 inch, resulting in an extremely small portion of the wood being wasted as sawdust. As set forth above, the production of sawdust by sawmills is a significant problem because of the loss of potential processed lumber, the difficulty and cost of disposal, and the danger of spontaneous combustion of the sawdust.

The advantages of using a band saw to manufacture such items as disposable, wooden, shipping pallets are significant; however, band-saw apparatus have not been used in such manufacturing operations because it was necessary to handle the wood being cut manually, resulting in slow operation and high labor costs. Prior systems for automatically feeding lumber through a band saw generally included a work guide mounted with relation to the plane of the saw blade to permit adjustment of the thickness of the cuts, and an opposed plurality of driven wheels, which also had to be adjustably mounted with respect to the plane of the saw blade to permit variable thicknesses of lumber to be cut. In operation, a piece of lumber would be placed between the driven wheels and the guide and driven through the band saw to cut the lumber into the prescribed thickness. Upon completion of the cut, the uncut work was carried by hand back to a "home" position and again fitted into the drive means in preparation for the next cut. Reciprocation of the uncut lumber was not possible with prior band-saw apparatus because during the return stroke of the work after completion of the cut, the work would contact and rub against the band-saw blade and often damage the blade or pull it off of its driving wheels. Band-saw blades with teeth on both edges capable of cutting the lumber both during the forward and return movement of the lumber were also not entirely acceptable because of the size and cost of the blades.

In addition to the necessity of carrying the uncut lumber back to the home position following each cut, it was also necessary, when using band saws, to position a new piece of lumber to be cut into the apparatus after the piece being operated on had been fully cut. In addition, the apparatus had to be carefully monitored to insure that the workpiece was properly aligned and positioned relative to the cutting plane of the blade to obtain straight, uniform slats of the desired thickness. Also, in prior systems, to adjust the tension of the saw blade or to replace a saw blade was a relatively complicated and time-consuming project, requiring that the system be shut down for substantial periods.

Thus, in general, the use of prior band-saw systems to cut a plurality of pieces of wood required substantial operator involvement to operate and monitor the system. This resulted in substantial labor costs and a relatively slow operating speed.

SUMMARY OF THE INVENTION

This invention provides an automatic band-saw system in which lumber to be cut is fed in predetermined lengths, which may be varied from between one to five feet, automatically into and through a band-saw blade by a reciprocating work table, and automatically cut into any desired thickness greater than about 1/16 inch, such cuts most typically being in the range of about ½ inch to several inches.

According to one aspect of the invention, a band-saw system is provided which comprises: first means for driving a flexible band-saw blade in a cutting plane; second means for supporting and driving work to be cut by said saw blade into a plurality of pieces, said second means including means for reciprocating said work in a direction parallel to said cutting plane of said blade from a home position to a forward position for cutting said work, and to return said work from said forward position back to said home position; and third means for moving said saw blade into and out of said cutting plane, said third means including means for positioning said saw blade in said cutting plane as said second means moves said work from said home position to said forward position for cutting said work and for positioning said saw blade out of said cutting plane as said second means returns said work from said forward position to said home position so that said work will clear and not contact said blade as it returns from said forward position to said home position.

Thus, with the present invention, the saw blade is automatically retracted out of the cutting plane and away from the work during each return stroke of the reciprocating means following a cutting operation and returned into the cutting plane prior to each cutting stroke. Accordingly, the work will not contact and rub against the saw blade during the return stroke; and the work can safely be returned to the home position automatically without it being necessary to carry the work to the home position and without operator involvement of any kind.

According to a presently preferred embodiment, the third means includes mechanical blade-moving means connected to movable blade supports and actuated automatically by the work-reciprocating means as it is reciprocated to move the work back and forth between the home position and the forward position to move the blade into and out of the cutting plane at the proper times during system operation.

Following the return of the work to the home position after each cutting stroke, the uncut work must be moved transversely relative to the cutting plane to position it relative to the saw blade for cutting the next piece from the work. According to a further aspect of the invention, the system includes means for automatically moving the work transversely prior to each cutting stroke against a fence which is adjustably positioned with respect to the cutting plane to define the thickness of the pieces to be cut from the work.

According to a presently preferred embodiment, the reciprocating means comprises a work carrier and includes a plurality of transversely oriented, motor-driven chains upon which the work is supported. As the work is returned to the home position, the work carrier enables a switch to actuate the chain drive motor to cause the chains to carry the work transversely across the work carrier, substantially perpendicular to the cutting plane into contact with the fence.

The fence includes alignment-indicating means to insure that the work is properly aligned with the cutting plane prior to initiation of each cutting stroke. Specifically, the alignment-indicating means includes switch means which are actuated only when both ends of the work are simultaneously aligned with the cutting plane. Actuation of the switch means on the fence automatically disables the chain drive motor to prevent further transverse movement of the work and enables the motor driving the work carrier to move the work from the home position to the forward position to cut the next piece from the work.

Thus, with the present invention, the work is automatically positioned and aligned relative to the cutting blade prior to each cutting stroke of the system.

According to a further aspect of the invention, the system includes work-engaging means for engaging the work during operation of the system to help prevent any shifting or movement of the work as it is being cut and during the return stroke. Means are also provided for automatically moving the work-engaging means away from and out of engagement with the work during the period that the work is being moved transversely to position it for the next cutting operation.

The work carrier is sized to carry a plurality of pieces of work in side-by-side relationship. Accordingly, as the cutting of each workpiece is completed, the transversely oriented chains automatically move the next workpiece into position to be cut. The system of the present invention is thus capable of operating continuously for an indefinite period of time. An operator is needed only to periodically add new workpieces to the work carrier, and this can be done without stopping the operation of the system.

In accordance with yet a further aspect of the invention, the system includes means for adjusting the tension of the saw blade and for removing and replacing a saw blade quickly and easily without any disassembly of the system being necessary. In prior band-saw systems, adjustment or replacement of a saw blade was often a relatively complex and time-consuming operation, requiring several components to be loosened or disassembled. In the present invention, means are provided which permit replacement of the band-saw blade and an automatic, accurate adjustment of the tension of the new saw blade, thus permitting quick and easy blade replacement with a minimal period of system shutdown.

In general, the band-saw-cutting system of the present invention comprises an integrated band-saw, lumber-feeding apparatus which permits lumber to be cut automatically in a rapid, reliable manner with minimal operator involvement. The system of the present invention provides many advantages of a gang-saw system without its attendant disadvantages.

Further advantages and specific features of the invention will be set forth hereinafter in the following detailed description of the preferred embodiments taken in conjunction with the drawings.

DETAILED DESCRIPTION OF THE PREFERRED EMBODIMENTS

Figure 1:
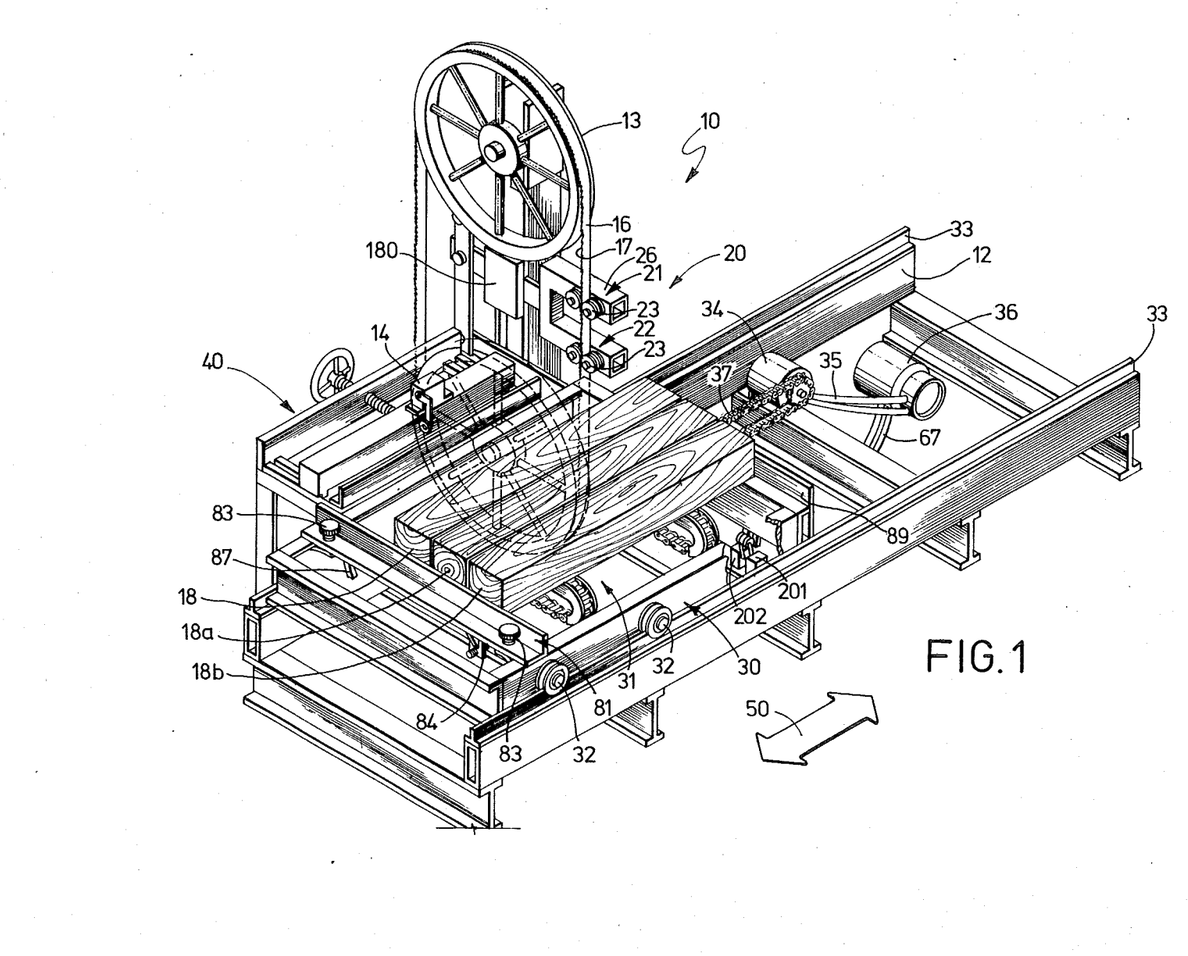
FIG. 1 illustrates an automatic band-saw system according to a presently preferred embodiment of the invention.

FIG. 1 illustrates an automatic band-saw-cutting system according to a presently preferred embodiment of the invention. The system is generally designated by reference numeral 10 and includes a frame 12, portions of which have been omitted for clarity, for supporting the various components of the system. In practice, the frame will include a base sized to support the work-supporting and -driving surface of the system at about waist height.

Mounted to the frame is a pair of wheels or pulleys 13 and 14 which are adapted to carry and drive an endless band-saw blade 16. Preferably, upper wheel 13 comprises an idler wheel; and lower wheel 14 (which is shown in dotted line in FIG. 1) comprises a driven wheel. Driven wheel 14 is coupled to and driven into rotation by an electric motor (not shown) which can conveniently be powered from a standard 220 volt power supply. Band-saw blade 16 has a single, toothed, cutting edge 17 which is adapted to cut boards or other pieces from lumber or other work 18 as the work is moved into and past the blade as is known to those skilled in the art.

The band-saw blade 16 extends between a pair of blade supports or guides 21 and 22 which are movably mounted to a section of the frame 12 and positioned above and below the plane of the work-supporting and -driving surface, respectively. Supports 21 and 22 are shown in greater detail in FIGS. 5A and 5B, and each comprises a pair of rollers 23 which are supported to be freely rotatable on shafts 24 and to guide and support the band-saw blade 16 as it moves therebetween during a cutting operation. Rollers 23 can be of any known construction; but preferably, each is of hardened steel in one-piece construction and is held together on shaft 24 to define the rollers. Supports 21 and 22 are mounted to a U-shaped member 26 which is incorporated into a blade-moving means 20 which functions to move the band-saw blade into and out of a cutting plane during operation of the system 10 as will be explained in greater detail hereinafter.

Also supported on frame 12 is a work-supporting and -driving means generally designated by reference numeral 30. Means 30 includes a work carrier or table 31 for supporting a plurality of workpieces 18, 18a, 18b, etc., such as pieces of lumber, to be cut and comprises a rectangular-shaped member sized to support several pieces of work of up to five feet in length. A plurality of wheels 32, mounted to each side of work carrier 31, is adapted to carry the work carrier 31 on a pair of tracks 33 formed on frame 12. Work carrier 31 is adapted to be reciprocated back and forth along tracks 33 between a rearwardmost, or home, position illustrated in FIG. 1 to a forwardmost position by a reversible, hydraulic motor 34 operated by a hydraulic pump 36 through lines 35. As shown in FIG. 1, motor 34 is mounted on frame 12 and is mechanically connected to carrier 31 by an endless chain 37 whereby operation of the motor 34 in the forward or reverse directions will drive the carrier forward or backward along tracks 33. Operation of the motor 34 is automatically controlled by the mechanical actuation of a plurality of switches during operation of the system, as will be described hereinafter.

System 10 also includes a fence 40 carried by the frame 12 adjacent the work-supporting and -driving means 30. Fence 40 includes means for positioning the work 18 relative to the cutting plane of the system to define the thickness of the pieces to be cut from the work by the saw blade 16. Fence 40 is adjustable to vary the thickness of the cut pieces and, as will be described hereinafter, includes means for insuring that the work is properly aligned with the cutting plane prior to the initiation of each cutting stroke of the work carrier to insure that uniform sections of the desired thickness will be cut from the work during each cycle of operation of the system.

Figures 2, 7A, 7B:
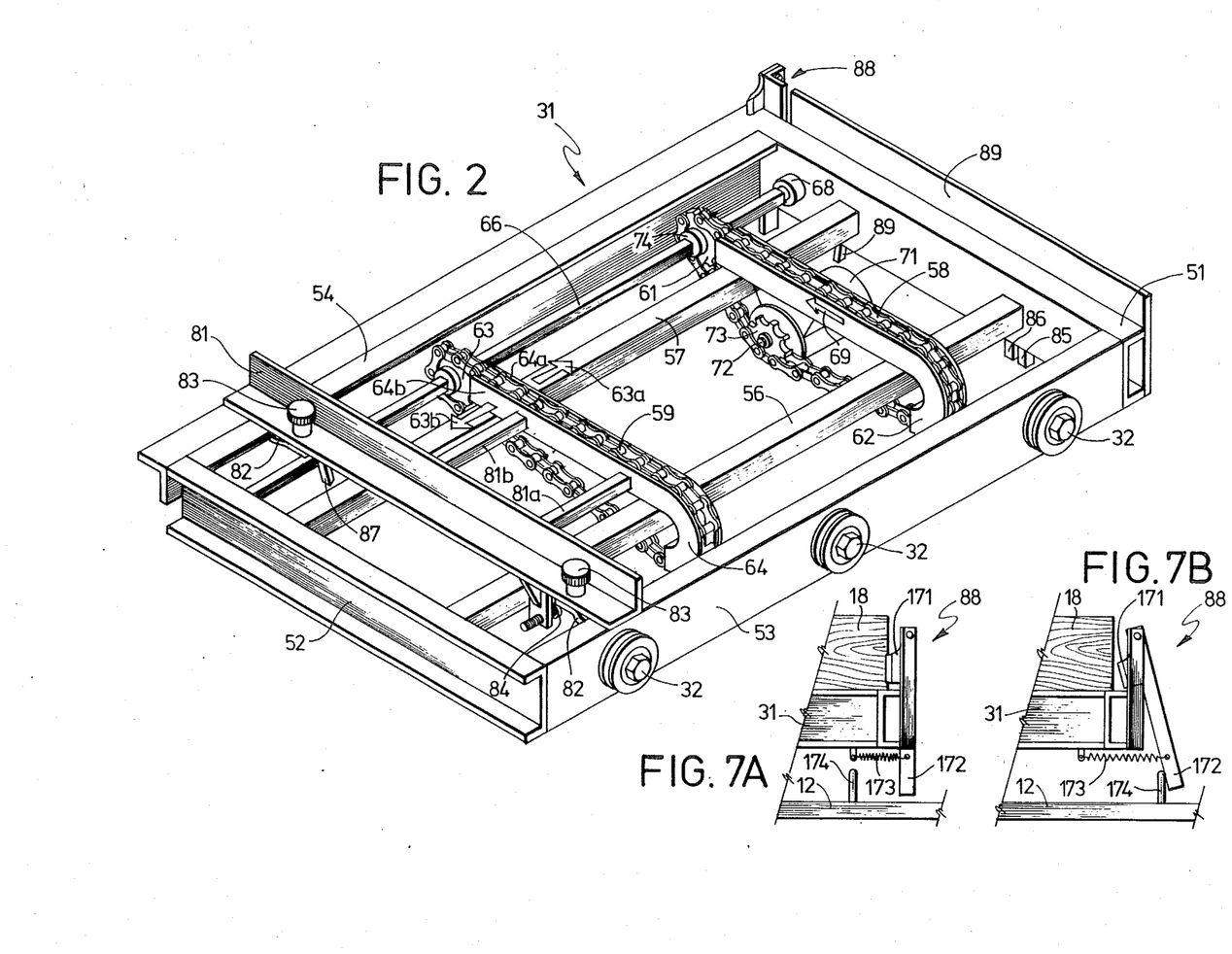
FIG. 2 illustrates the work carrier of FIG. 1 in greater detail.
FIGS. 7A and 7B illustrate the work-engaging means of FIG. 2 in greater detail with FIG. 7A illustrating the work-engaging means in engagement with the work and FIG. 7B illustrating the work-engaging means disengaged from the work.

Work carrier 31 is illustrated in greater detail in FIG. 2. As shown, work carrier 31 is of rectangular shape and includes front and back walls 51 and 52 and sidewalls 53 and 54. Sidewalls 53 and 54 are adapted to support the plurality of wheels 32 which ride upon tracks 33 on frame 12 as described previously. A pair of bars 56 and 57 connects the front and back walls to add strength and rigidity to the carrier.

One or more pieces of work 18 (FIG. 1) are supported on a pair of endless chains 58 and 59 and chain supports 62 and 64 extending transversely across the table between sidewalls 53 and 54, the upper surfaces of the chains thereby defining the work-supporting and -driving surface of the system. Chain 58 is fixedly carried by the work carrier 31 on a sprocket 61, and chain 59 is adjustably carried by the work carrier on a sprocket 63. Sprockets 61 and 63 are mounted on and keyed to a shaft 66 of square cross section so that the sprockets 61 and 63 will rotate together. Shaft 66 is coupled to front and back walls 51 and 52 of work carrier 31 by bearing mounts 68 such that it is freely rotatable relative to the walls of the work carrier. A pair of curved supports 62 and 64 rests on bars 56 and 57 and supports the chains 58 and 59. The curved supports 62 and 64 support the chains 58 and 59, respective, and carry the weight of the workpieces that are laid upon the chains 58 and 59. Sprocket 63 and chain support 64 are not permanently fastened to either shaft 66 or bars 56 and 57, but are free for for sliding movement therealong (as indicated by arrows 63a and 63b in FIG. 2). Because sprockets 61 and 63 are mounted on the square shaft 66, they are simultaneously driven in rotation.

A hydraulic motor 71 also driven by hydraulic pump 36 via lines 67 (FIG. 1) is mounted to the underside of work carrier 31 as by being mounted to bar 57; and the motor drive shaft 72 carries a sprocket 73 to which engages the chain 58. Upon actuation of motor 71 during operation of the system, the rotation of motor drive shaft 72 and sprocket 73 will drive the chain 58 in the direction indicated by arrow 69. Chain 58 will rotate sprocket 61, causing rectangular-shaped shaft 66 to similarly rotate and, in turn, rotate sprocket 63 to also move drive chain 59. As the chains are driven, any workpieces supported on the chains will be carried by friction in the direction indicated by arrows 69 from side 53 of the work carrier 31 remote from the saw blade to side 54 thereof adjacent the saw blade to permit sections to be successively cut from the work as will be explained hereinafter.

Sprocket 61 is fixedly mounted to shaft 66 by coupling 74, and curved support 62 is fixedly mounted to bars 56 and 57 so that chain 58 is fixedly positioned on work carrier 31.

Sprocket 63 and curved support 64, however, are adjustably mounted to carrier 31, as set forth above, so that they can be slid back and forth along the length of the shaft 66.

Also adjustably supported on work carrier 31 is a stop 81. Stop 81 comprises a bar extending across the carrier 31 from sidewall 53 to sidewall 54 and is mounted to sidewalls 53 and 54 by adjustable mounting means 82. Specifically, by loosening bolts 83 on mounting means 82, stop 81 can be slid forwardly or rearwardly along sidewalls 53 and 54 away from or toward back wall 52. Support 64 has portions 64a and 64b that project beyond the sides of sprocket 63. Support 64 is attached to stop 81 by a pair of connecting bars 81a and 81b so that as fence 81 is moved, support 64 is moved; and the chain 59 can be slid along the length of shaft 66 to vary the distance between the two chains 58 and 59 to adjust the carrier to receive and support workpieces of differing lengths so that the workpieces will be properly supported by the chains and supports irrespective of their length. After adjustment of the position of chain 59, bolts 83 are tightened and locked in position. Thus, for relatively short workpieces, the chains are positioned relatively close together; and for longer workpieces, the chains are positioned farther apart. With this adjustment capability, the work carrier 31 can readily support work of from about one foot to about five feet in length.

Stop 81 defines a wall against which the back end of the work 18 (FIG. 1) can abut during operation of the system to limit the rearward movement of the work as it is being cut and is adjusted forwardly or rearwardly as a function of the length of the work being cut. As will be explained hereinafter, stop 81 also carries switch-actuating means 84 for controlling the reciprocating movement of work carrier 31 and a first projection 87 adapted to engage a mechanical blade-moving means during operation of the system.

A plurality of switch-operating means 85 and 86 and a second projection 89 are also carried by the work carrier and extend downwardly from the front wall 51. As will be described hereinafter, carrier 31 also supports a work-engaging means 88 to help hold the work straight and steady during reciprocation of the work carrier and a front guide 89.

Figures 3, 8:
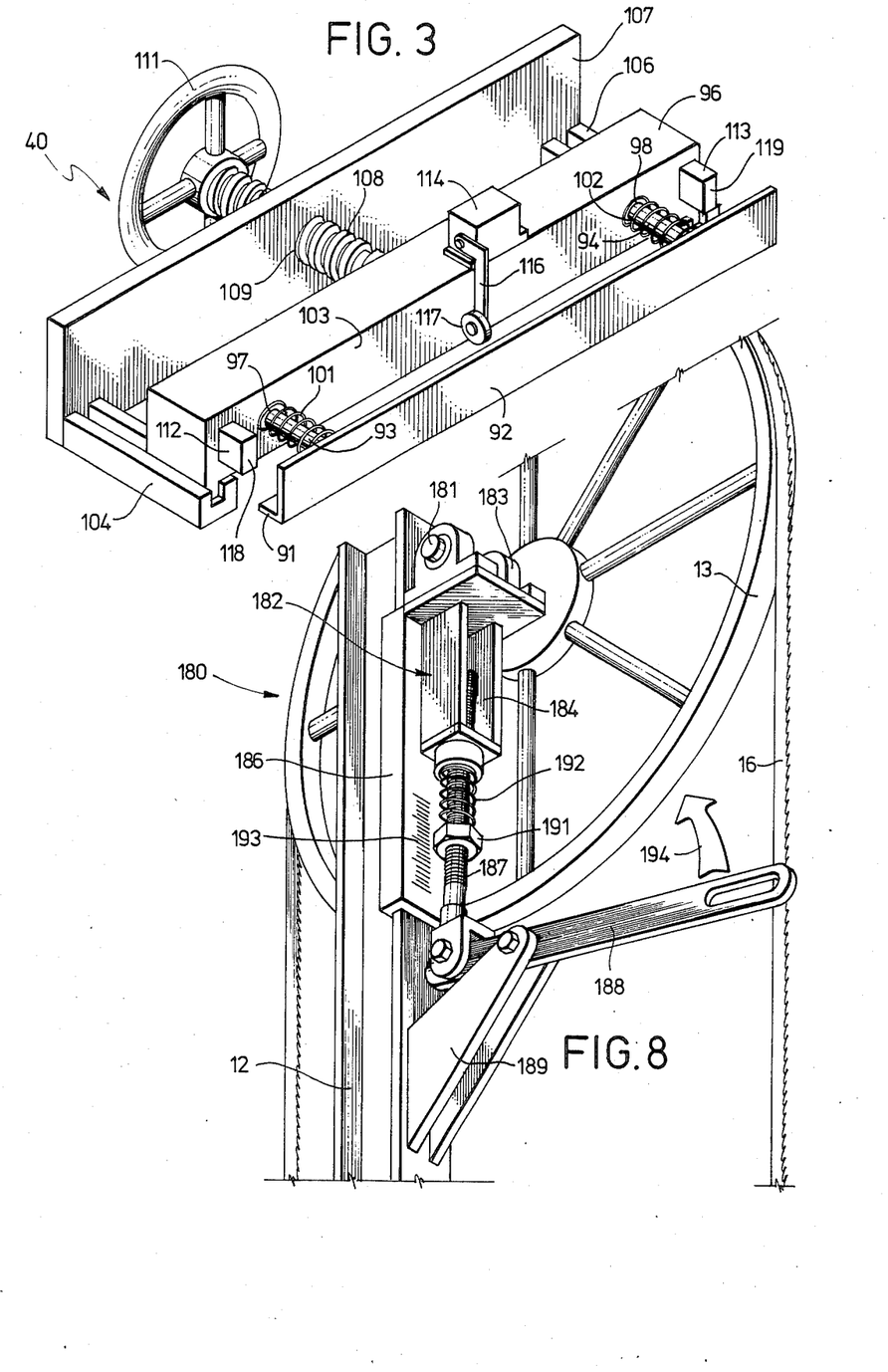
FIG. 3 illustrates the fence of FIG. 1 in greater detail.
FIG. 8 illustrates the means for adjusting the tension of a band-saw blade and for replacing or removing a band-saw blade according to a presently preferred embodiment of the invention.

FIG. 3 illustrates the fence 40 in greater detail. Fence 40 is mounted to frame 12 next to the sidewall 54 of work carrier 31 adjacent the saw blade 16 and is provided to define the thickness of the piece to be cut from work 18. More particularly, fence 40 includes an elongated plate or bar 91 having a face 92 which extends substantially parallel to the cutting plane of the saw blade 16. A pair of rods 93 and 94 is mounted to the back face of plate 91 and extends into a housing 96 through openings 97 and 98 therein. Rods 93 and 94 are slidable into and out of housing 96; however, springs 101 and 102, surrounding the rods 93 and 94, respectively, and extending between the back face of plate 91 and the wall 103 of housing 96, bias the plate 91 and the rods 93 and 94 attached thereto away from the housing 96 to a position spaced from stops 112 and 113 extending from the wall 103 of housing 96.

Housing 96 is slidably supported on tracks 104 and 106 extending from a plate 107 rigidly mounted to a section of frame 12. A threaded rod 108 is journalled to and extends from the back face of housing 96, through a threaded opening 109 in plate 107, and has a wheel 111 mounted on the end thereof.

By rotating wheel 111, threaded rod 108 can be threaded into or out of opening 109 in plate 107, causing housing 96 to slide forwardly or rearwardly along tracks 104 and 106. Movement of the housing 96 adjusts the positions of stops 112 and 113 and defines the thickness of the pieces to be cut from the work 18.

In addition, fence 40 includes alignment-indicating means for insuring that the work to be cut is aligned with the cutting plane of the saw blade 16 before actuation of work carrier drive motor 34 to initiate a cutting stroke. In this regard, housing 96 also supports a limit switch 114 which is actuated by movement of an L-shaped arm 116 which is positioned exactly halfway between stops 112 and 113. The end of L-shaped arm 116 supports a contact member 117 whose contact surface is also in the plane defined by the faces 118 and 119 of stop members 112 and 113 when the switch is actuated but normally projects slightly beyond the plane of faces 118 and 119.

In operation, as a piece of work 18 is being driven in the direction indicated by arrow 69 toward sidewall 54 of work carrier 31 in a direction substantially perpendicular to the cutting plane of blade 16 (see FIGS. 1 and 2), it will eventually contact member 117 of limit switch 114.

In order to actuate switch 114 to initiate a cutting operation, it is necessary that the back wall of plate 91 move contact member 117 into the same plane as faces 118 and 119 of the stops; and this occurs only if plate 91 is substantially in contact with both stops 112 and 113 which define the thickness of the cut. Therefore, both ends of the work 18 are simultaneously in contact with face 92 of plate 91 and thus aligned with the cutting plane of blade 16 before a cutting operation can be initiated. If the work is not properly aligned when it first impinges upon face 92, it will first move only one side of the plate 91 to impinge upon the face of one of the stops. Contact member 117 will not be moved a sufficient distance to actuate switch 114. The chains 58 and 59 will continue to operate until the work has straightened itself out and has moved plate 91 to a position where the faces of both stops 112 and 113 are substantially impinged. Only at that instant will contact 117 be moved sufficiently to actuate switch 114 via L-shaped arm 116. Actuation of switch 114 stops hydraulic motor 71 (FIG. 2), stopping the movement of chains 58 and 59 and preventing further movement of the work. Simultaneously, actuation of switch 114 enables motor 34 (FIG. 1) to drive the work carrier 31 forwardly to carry the work from the home position into and through blade 16 to cut the work to the thickness selected by rotating wheel 111.

Figure 4:
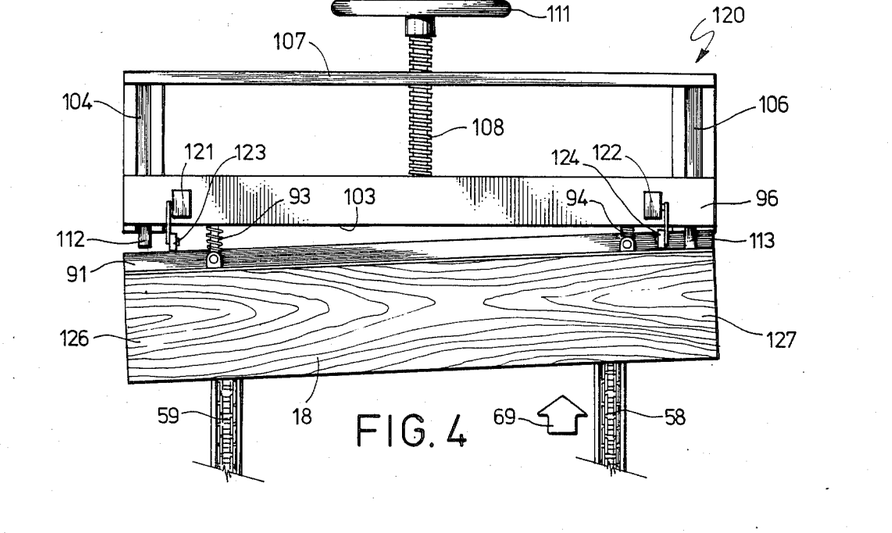
FIG. 4 schematically illustrates a top view of a fence according to an alternative embodiment of the invention.

The operation of fence 40 can, perhaps, be better understood from FIG. 4 which schematically illustrates an alternative embodiment of the fence. FIG. 4 illustrates a top view of a fence 120, and like reference numerals are used in FIG. 4 to identify components which correspond to like components in fence 40 of the FIG. 3 embodiment.

Fence 120 is similar to fence 40 except that centrally positioned switch 114 has been replaced by two limit switches 121 and 122 having switch contacts 123 and 124 extending outwardly at opposite ends of face 103 of housing 96. Switches 121 and 122 are connected in series so that both switches must be simultaneously tripped before a cutting operation will be initiated. Accordingly, switch contacts 123 and 124 must be simultaneously impinged by plate 91 which can happen only if both ends 126 and 127 of work 18 simultaneously press plate 91 substantially against contacts 123 and 124 as chains 58 and 59 move the work in the direction of arrow 69 into plate 91.

In FIG. 4, the work is not straight. Accordingly, end 127 has pushed plate 91 against contact 124; but end 126 of the work has not yet pushed plate 91 against contact 123. Switch 121, therefore, has not yet been tripped; and motor 71 (FIG. 2) will remain actuated and continue to drive chains 58 and 59. Chain 58 will slip under work 18, and chain 59 will move end 126 of the work 18 forwardly. When both contacts 123 and 124 are impinged by plate 91, both switches 121 and 122 will be tripped to stop motor 71, terminating further transverse movement of work 18 and causing motor 34 to be enabled to initiate forward movement of work carrier 31 to carry work 18 into and through saw blade 16 to cut the work. When both contacts 123 and 124 are impinged, the work 18 will be aligned with the cutting plane to insure that a straight cut is made through the work and that the cut section will be of uniform thickness.

Referring back to FIG. 1, work carrier 31 is adapted to be reciprocated back and forth in the direction indicated by arrow 50 to carry the work 18 between a first home position, as illustrated in FIG. 1, and a forward position at which the work has cleared the saw blade 16 and been fully cut. During each cycle, carrier 31 carries the work from its home position to its forward position during the cutting stroke of the cycle and then back to the home position during the return portion of the cycle.

In prior band-saw systems, it was necessary to pick up the uncut work after each cutting stroke and carry it back to the home position for the next cutting stroke. A return stroke was not possible because the uncut work would contact and rub against the saw blade and damage the blade or pull it off of its driving wheels. Automatic operation of prior systems was thus not possible, and the cutting rate of the system was severely limited.

According to the present invention, this inadequacy of prior band-saw systems has been obviated by including blade-moving means 20 for automatically moving the saw blade out of the cutting plane prior to each return stroke and for automatically returning it into the cutting plane prior to each cutting stroke. Blade-moving means 20 is illustrated in detail in FIGS. 5A and 5B which show the saw blade in the cutting plane and displaced from the cutting plane, respectively.

Figure 5A:
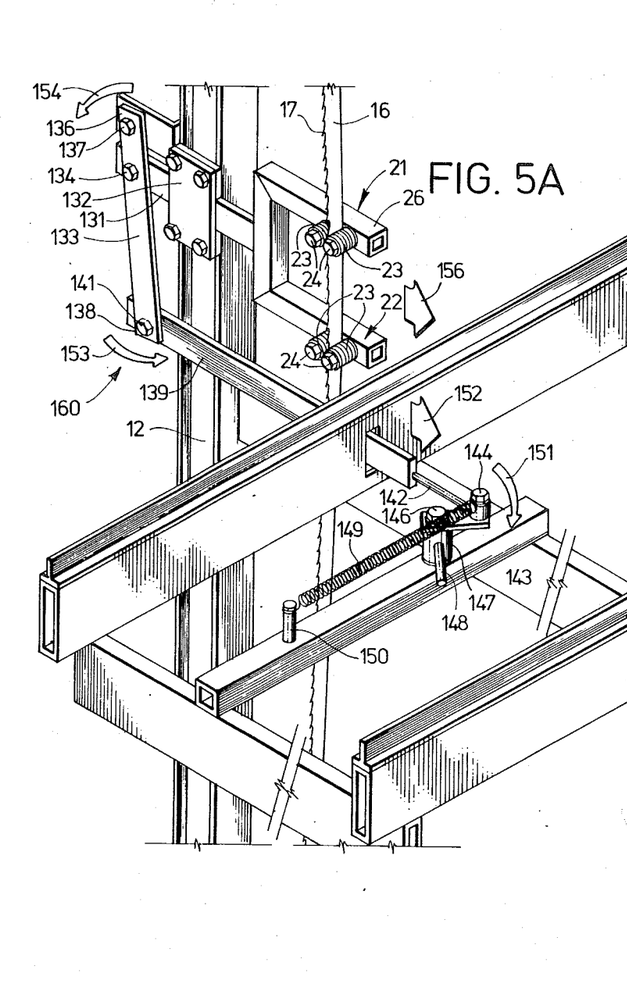
FIGS. 5A and 5B illustrate the blade-moving means of FIG. 1 with the blade positioned in the cutting plane in FIG. 5A and displaced from the cutting plane in FIG. 5B.
Figure 5B:
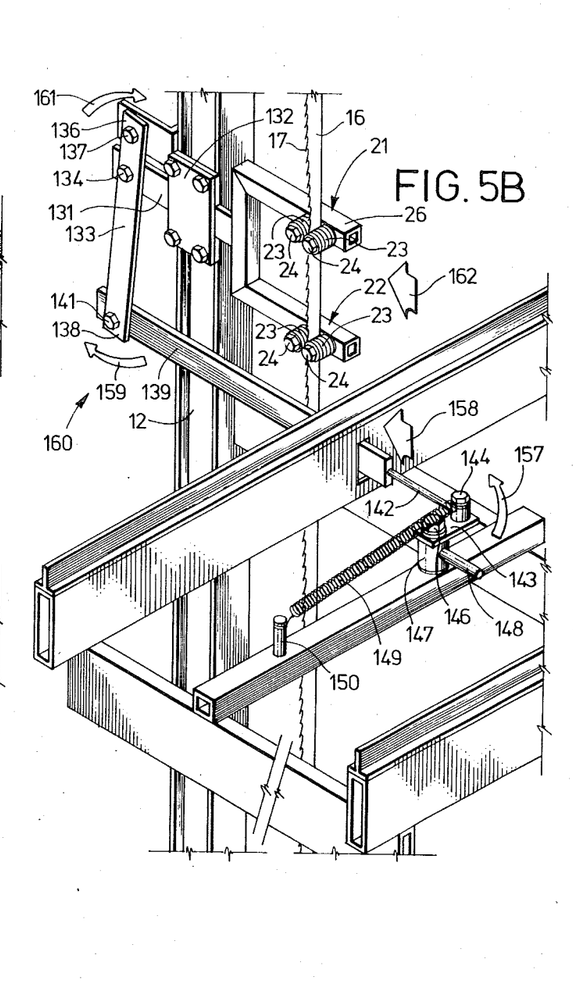

As indicated previously, the saw blade 16 is preferably supported between a pair of supports or guides 21 and 22 positioned above and below the work-supporting and -driving surface of the system although only one support or guide 21 may be used. Each support or guide 21 and 22 preferably comprises a pair of rollers 23 supporting the saw blade therebetween.

Supports 21 and 22 are mounted to a linkage system generally designated by reference numeral 160, including a U-shaped member 26, having a shaft 131 connected to its base. Shaft 131 is slidably supported within a mounting 132 mounted to frame 12. Shaft 131 is pivotally coupled to first arm 133 by rotatable coupling 134 positioned between ends 136 and 138 of first arm 133. Arm 133 is pivotably mounted to frame 12 at its end 136 by rotatable coupling 137. The opposite end 138 of first arm 133 is pivotally coupled to one end of a second arm 139 by rotatable coupling 141. Rotatable couplings 134, 137, and 141 may be appropriate screws, not fasteners. A rod 142 extends from the opposite end of second arm 139 and is pivotally connected to one end of a short third arm 143 by coupling 144. The opposite end of short third arm 143 is, in turn, rigidly connected via coupling 146 to a crank 147 having a crank arm 148 extending outwardly therefrom.

Crank 147 is pivotally mounted to frame 12 and is positioned such that crank arm 148 will be impinged by projections 87 and 89 which extend downwardly from the stop 81 and the front wall 51 of work carrier 31, respectively (see FIG. 2). An over center spring 149 connects the forward end of short arm 143 with a rod 150 attached to the frame. Spring 149 passes over the pivot of crank 147 as the crank 147 is rotated about its pivot (the central axis of screw fastener 146) between the positions shown in FIGS. 5A and 5B, and its tension will hold crank 147 in the positions shown. FIG. 5A illustrates the saw blade 16 in the cutting plane in position to cut a section from work 18. At the home position, crank arm 148 and crank 147 will be rotated to the left as shown in FIG. 5A by having been impinged by projection 89 as the work carrier 31 is moved to the home position. The relative position of the components is shown more clearly in FIG. 6A which schematically illustrates a side view of the system with carrier 31 and work 18 in its rearwardmost, or home, position.

As shown in the corresponding FIG. 5A, rotation of crank arm 148 to the left by projection 89 rotates short third arm 143 in the direction indicated by arrow 151 which causes rod 142 and second arm 139 to move in the direction of arrow 152. In turn, end 138 of first arm 133 rotates in the direction indicated by arrow 153; and opposite end 136 of first arm 133 rotates in the direction indicated by arrow 154. Shaft 131 moves in the direction shown by arrow 156 to, in turn, push U-shaped member 26, supports 21 and 22 mounted thereon, and the saw blade 16 supported thereby into the cutting plane in preparation for the next cutting stroke of the system.

Figure 6A:
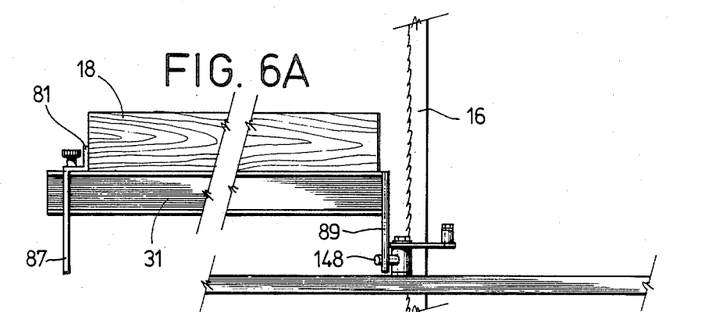
FIGS. 6A and 6B schematically illustrate the actuation of the blade-moving means by the work carrier during reciprocation of the work carrier.
Figure 6B:
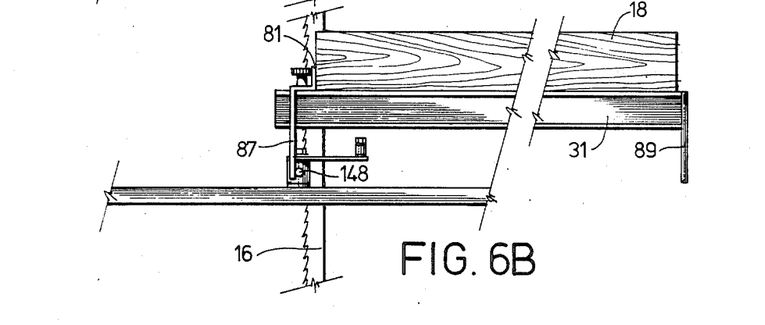

Following a cutting stroke, and prior to the return stroke, the work carrier will be moved to its forwardmost position, as shown in FIGS. 6A and 6B. Just prior to reaching that position, projection 87 will impinge arm 148 and rotate it to the right into the position shown in FIG. 5B. Rotation of arm 148 and crank 147 to the right will rotate third short arm 143 in the direction indicated by arrow 157 in FIG. 5B, causing rod 142 and second arm 139 to move in the direction of arrow 158, causing ends 138 and 136 of first arm 133 to rotate in the directions of arrows 159 and 161, respectively. Shaft 131 and U-shaped member 26 will move in the direction of arrow 162, causing saw blade 16 to be moved out of the cutting plane and away from the work as it is returned to the home position during the return stroke.

Upon return to the home position, projection 89 will again impinge arm 148 to return the saw blade into the cutting plane for the next cutting cycle.

The linkage assembly, generally designated by reference numeral 160, is designed to move the saw blade only about one-quarter of an inch out of the cutting plane. This distance is sufficient to insure that the work will not contact the blade during the return stroke of the work carrier and will not place the blade under an excessive tension that might cause it to break. Because projection 87 is mounted to stop 81, it moves with stop 81 when the stop is adjusted to accommodate different lengths of work. Thus, projection 87 will always impinge upon crank arm 148 to move the blade into the cutting plane when the work reaches its home position.

Thus, with the present invention, work carrier 31 can automatically be reciprocated back and forth during each cutting cycle without handling the work 18. The work is automatically carried back to the home position following each cutting stroke without risk of damaging the blade or causing it to be pulled off of its wheels as a result of contact with the work during the return stroke.

During each cycle of the system, it is desirable that the work 18 remain substantially immobile during both the cutting stroke or the return stroke. Excessive movement of the work can result in a cut that is jagged and uneven or in the uncut work moving to a position where it hits the blade during the return stroke. This danger is substantially eliminated in the present invention by work-engaging means 88 which is mounted to the front wall 51 of work carrier 31, as shown in FIG. 2. Work-engaging means 88 includes a sharpened member 171 that is adapted to engage and become slightly embedded in the front face of the work 18 during the cutting and return strokes to hold the work steady and to help prevent it from moving around to any significant extent. Work-engaging means 88 is preferably positioned so that the sharpened member 171 will engage the uncut portion of the work closely adjacent to the saw blade 16.

During the operation of cutting system 10, however, it is necessary that the work-engaging means be briefly disengaged from the work 18 so that the work will be free to be moved transversely against fence 40 by chains 58 and 59 to position the work prior to each cutting stroke. With the present invention, means are provided to automatically disengage the work when the work reaches the home position and to reengage the work prior to each cutting stroke.

In FIG. 7A, sharpened member 171 is shown in engagement with work 18. Sharpened member 171 includes a portion 172 which extends downwardly below the level of work carrier 31. A spring 173 connects depending portion 172 to carrier 31 so that it will normally urge sharpened portion 171 into engagement with the front end of the work as shown.

Extended portion 172 is aligned with a projection 174 on frame 12. Projection 174 is positioned on frame 12 so that it will contact extended portion 172 during the return stroke of the carrier just prior to its reaching its rearwardmost, or home, position shown in FIG. 1. When extended portion 172 contacts projection 174, as shown in FIG. 7B, it will be pushed outwardly against the bias of spring 173 and cause sharpened member 171 to disengage the work. The work is thus released so that it may be moved transversely into the cutting position by chains 58 and 59.

As soon as the work has been moved against the fence 40 to define the thickness of the cut, and work carrier 31 begins its forward movement to initiate the next cutting stroke, extended portion 172 will be released by projection 174, allowing spring 173 to again drive the sharpened member 171 into the work 18. Thus, the work 18 will be engaged by work-engaging means 88 during substantially the entire cutting and return strokes of the work and automatically released only briefly to permit transverse movement of the work against the fence 40 prior to each cutting stroke. The work will therefore be held during the cutting and return strokes without interfering with the operation of the system.

During operation of the system 10, it is periodically necessary to adjust the tension on saw blade 16 or to replace the blade if it breaks or otherwise ceases cutting effectively. In prior systems, these are usually relatively complex operations necessitating shutdown of the system for substantial periods of time.

In the system of the present invention, means are provided whereby the tension on the saw blade 16 can be adjusted easily and accurately while the system is operating and whereby a blade can be quickly removed and replaced with the same tension and a minimum system downtime. This structure is schematically identified in FIG. 1 by reference numeral 180 and is illustrated in greater detail in FIG. 8.

As shown in FIG. 8, upper wheel 13 supporting saw blade 16 is carried on an axle 181 which is mounted on a rigid assembly 182 comprising a shaft-receiving member 183, a U-shaped element 184, and a sleeve 186 which is slidably mounted on a section of frame 12. One end of a threaded rod 187 extends through an aperture in U-shaped element 184; and the opposite end of rod 187 is pivotally connected to one end of a lever 188 which, in turn, is pivotally mounted on a lever support 189 mounted to the frame. A nut 191 is threaded on rod 187, and a die spring 192 surrounds the rod 187 between the nut 191 and the U-shaped element 184.

To adjust the tension on saw blade 16, it is only necessary to rotate nut 191. Specifically, to increase the tension, nut 191 is rotated to raise the nut. Raising the nut 191 increases the force exerted by the spring on U-shaped element 184 and on assembly 182 as a whole, urging the assembly and wheel 13 upwardly on frame 12 with greater force and thus increasing the force, urging wheels 13 and 14 apart and increasing the tension on blade 16. To reduce the tension, the nut is simply rotated to lower the nut, reducing the force exerted by spring 192 on assembly 182 and reducing the force, urging wheels 13 and 14 apart.

Thus, with the present invention, the tension on saw blade 16 can be adjusted merely by rotating a single nut; and this adjustment can be done while the system is in operation. If desired, a series of indicia 193 can be placed on slide 180 adjacent nut 191 and the apparatus calibrated relative to the indicia to permit the precise tension desired to be set quickly and accurately by simply aligning the nut with the desired gradation.

To completely release the tension on the blade 16 to permit replacement of the blade, lever 188 is moved upwardly, as indicated by arrow 194. Rod 187 is caused to move downwardly, allowing assembly 182 and wheel 13 to slide downwardly on frame 12 by a distance sufficient to loosen the blade 16 to an extent to allow it to be removed. After a new blade has been positioned on wheels 13 and 14, lever 188 is rotated downwardly to again raise assembly 182 and wheel 13 to reapply tension to the blade. Thus, tension control means 180 is capable of quickly releasing all tension from the blade to permit it to be removed or replaced and to precisely adjust the blade tension for best operation of the system.

The overall operation of the automatic band-saw-cutting system of the present invention will now be described with reference to the Figures. Let it be assumed that the work carrier 31 is in its rearwardmost position shown in FIG. 1 and that hydraulic motor 71 (FIG. 2) has been actuated to drive the chains 58 and 59 to move the work 18 toward the fence 40. The work will continue to be moved transversely against the fence 40 until the work causes plate 91 to simultaneously impinge against stops 112 and 113 (FIG. 3), indicating that the work is properly aligned with the cutting plane and in position to cut a section of predetermined thickness from the work, as adjusted by rotation of wheel 111 on the fence.

When the work is properly aligned with the cutting plane, switch 114 in FIG. 3 (or switches 121 and 122 in FIG. 4) will be tripped, stopping motor 71 to terminate the transverse movement of the work and enabling hydraulic motor 34 (FIG. 1) to initiate the cutting stroke of the load carrier. As the load carrier begins its cutting stroke, extended portion 172 of sharpened member 171 of the work-engaging means 88 will be released by projection 174 on the frame 12 (see FIGS. 7A and 7B), causing sharpened portion 171 to engage the work and hold it steady during the cutting cycle.

As the work carrier proceeds through the cutting stroke, the saw blade 16 engages and cuts the work piece 18 as it moves past the blade. After the work has been cut through, the cut section will simply fall off of the edge of the sidewall 54 of the work carrier into a bin or onto a suitable conveyor (not shown), as is known to those skilled in the art.

After the work carrier 31 has carried the work past the blade and just prior to its reaching the end of its forward motion, projection 87 on the work carrier will impinge crank arm 148 of the blade-moving means, causing the crank 147 to pivot to the position illustrated in FIG. 5B to retract the blade 16 out of the cutting plane. Immediately thereafter, projection 84 on the stop 81 will strike a switch 201 (FIG. 1) mounted on the frame which will stop work carrier drive motor 34 and will cause it to immediately reverse its direction to initiate the return stroke of the work carrier 31. Since the blade 16 has been retracted out of the way by the action of the blade-moving means 20, the blade will not contact the returning work or otherwise rub against it with the resultant risk of damage to the blade.

The work carrier 31 will continue moving in the reverse direction; and as the work carried thereon passes the blade, projection 89 on the front wall 51 of the work carrier 31 will impinge upon crank arm 148, causing the arm to rotate to the position shown in FIG. 5A, returning the blade to the cutting plane for the next cutting stroke. The work carrier 31 will continue to move toward its rearwardmost position at which projection 85 on the front wall 51 of the carrier will impinge upon switch 201, moving the switch to its forward position. At the same time, projection 86 on front wall 51 will impinge upon switch 202 (FIG. 1), actuating motor 71 to cause the chains 58 and 59 to again drive the work transversely toward the fence to position the work for the next cutting stroke.

Although switch 201 has been tripped to its forward position by projection 85, motor 34 will not be actuated to initiate the cutting stroke because switch 114 in the fence is open. It is not until the work has been moved transversely against the fence and properly aligned with the cutting plane that switch 114 will be tripped to close the circuit between switch 201 and motor 34 and permit the next cutting stroke to begin.

Also, as the work carrier reaches its rearwardmost position, projection 174 on the frame 12 will impinge upon extended portion 172 of the sharpened member 171, pushing it out of engagement with the work so that the work 18 can be moved transversely by chains 58 and 59.

As the system continues to operate automatically in cyclical fashion, work will be continued to be fed transversely to the fence to permit successive sections of the work to be cut. As one piece of work 18 is fully cut, additional pieces 18a and 18b also supported on the work carrier will be automatically moved against the fence into position to be cut. Periodically, additional pieces of work can be added to the carrier so that the system can operate substantially continuously for so long as work remains to be cut. If necessary, the work carrier 31 may be reciprocated manually and achieve cutting at a slower rate.

While what has been described constitutes a presently most preferred embodiment of the invention, it should be understood that the invention could take numerous other forms. For example, the apparatus can be used to cut materials other than wood such as plastic, plasterboard, and other such materials; and the saw blade can be moved into and out of the cutting plane by an electrical solenoid, air or hydraulic cylinder means or other such moving actuators, actuated by switch means mounted on the frame and operated by the work carrier. Accordingly, it should be recognized that the invention should be limited only insofar as is required by the scope of the following claims.

I claim:

1. A band-saw-cutting system, comprising:
   means for supporting a flexible, band-saw blade;
   means for driving said saw blade in a cutting plane;
   means for supporting and driving work to be cut by said saw blade into a plurality of pieces, said supporting and driving means including a work carrier for carrying said work and means for reciprocating said work carrier and said work carried thereby in a direction parallel to said cutting plane of said blade from a home position to a forward position for cutting said work, and to return said work from said forward position back to said home positions;
   mechanical blade-moving means, including linkage means coupled to said saw blade support means, for moving said flexible saw blade into and out of said cutting plane, said saw blade support means positioning said saw blade in said cutting plane for cutting said work as said supporting and driving means moves said work from said home position to said forward position and being movable by said linkage out of said cutting plane as said supporting and driving means returns said work from said forward position to said home position so that said work will not contact said saw blade as it moves from said forward position to said home position; and
   means mounted on said work carrier for actuating said linkage means to move said saw blade into and out of said cutting plane during the reciprocation of said work carrier.

2. The system of claim 1 wherein said linkage means includes means extending into the path of said work carrier, and wherein said actuating means includes a first projection on said work carrier for impinging said extending means prior to the movement of said work from said home position to said forward position, and second projection on said work carrier for impinging said extending means prior to the movement of said work from said forward position to said home position.

3. The system of claim 2 wherein said extending means comprises a crank arm rotatable by said first and second projections to move said blade into and out of said cutting plane.

4. The system of claim 2 wherein said work carrier includes an adjustable work stop defining a variable home position of said work, and wherein said first projection is mounted to said adjustable stop and is adjustable therewith.

5. The system of claim 1 wherein said work carrier includes means for moving said work transversely thereon substantially perpendicular to said cutting plane for positioning said work relative to said cutting plane.

6. The system of claim 5 wherein said transverse moving means comprises chain means extending transversely across said work carrier and supporting said work thereon; and transverse chain drive means coupled to said chain means for moving said work transversely on said work carrier.

7. The system of claim 6 and further including means for automatically actuating said transverse chain drive means for transversely moving said work when said work is in said home position.

8. The system of claim 5 and further including an adjustable means for defining the thickness of sections to be cut from said work by said saw blade, said transverse moving means being operable to move said work against said adjustable means.

9. The system of claim 1 and further including work-engaging means for engaging said work to help prevent movement of said work on said work carrier during movement of said work from said home position to said forward position and from said forward position to said home position.

10. An automatic band saw-cutting system, comprising:
   a frame;
   a pair of rotatable wheels on said frame to carry and drive a band-saw blade comprising an upper idler saw-blade wheel and a lower drien saw-blade wheel;
   a continuous band-saw blade carried by said pair of rotatable wheels and presenting its toothed cutting edge between a pair of movable saw-blade supports,
   said saw blade generally lying in a plane that defines a cutting plane by its cutting edge;
   a work carrier carried by said frame to be movable in a direction parallel to the plane of the band-saw blade and forming a work-supporting and driving surface extending transversely from a side of the work carrier adjacent the band-saw blade to a side of the work carrier remote from the band-saw blade,
   said side of the work carrier adjacent the band-saw blade terminating adjacent and between said pair of blade supports and the presented cutting edge of said band-saw blade,
   said work-supporting and -driving surface being formed by the exposed upper surfaces of a pair of chains, one of said pair of chains being fixedly carried by said work carrier adjacent its front end and the other of said pair of chains being adjustably carried by said work carrier between its front end and its rear end,
   said chains being supported on sprockets, said sprockets being keyed upon a common shaft so they rotate together, said sprocket of said fixedly mounted chain being fixedly fastened to said shaft and said sprocket of said adjustably carried chain being slidable along the length of said shaft to vary the distance between the two chains and the length of the work-supporting and -driving surface between the front end and the rear end of the work carrier;
   a first motor carried by the work carrier with a driving sprocket on its rotatable shaft and engaging the fixedly mounted chain whereby energization of the first motor will drive both chains so that their upper surfaces may support and engage work and move the work transversely from the side of the work carrier remote from the band-saw blade to the side of the work carrier adjacent the band-saw blade;
   mechanical blade-moving means mounted on the frame below the work carrier and engageable by a surface of the work carrier, said mechanical blade-moving means being mechanically connected to the movable blade supports by an over center spring mechanism to move the band-saw blade into the cutting plane for cutting and to move the saw blade out of the cutting plane for clearance,
   said work carrier being mechanically attached to means to reciprocate it back and forth in a direction parallel to the cutting plane to carry said work from a home position to a forward position to cut said work, and back to said home position, said reciprocating means including a reciprocating chain carried by a pair of sprockets on the frame below the work carrier, said reciprocating chain being fastened to the work carrier and being driven by a second motor carried by the frame with a sprocket on its driven shaft and engaging the reciprocating chain, said means to power said second motor being adapted to rotate its shaft and the reciprocating chain in both directions and to reciprocate the work carrier back and forth; and
   control means on the frame to synchronize the movement of the work carrier, and its work-supporting and -driving surface and the movable blade supports in a repetitive cycle so that first with the carrier supporting the work in the home position, the first motor is energized to carry the work transversely past the cutting plane of the band-saw blade by a predetermined distance, and second upon detection of the work positioned parallel to and past the cutting plane of the band-saw blade by the predetermined distance, the second motor is energized to driving the work through the band-saw blade from the home position to the forward position to cut from the work a piece of predetermined thickness, and third upon completion of travel of the work through the band-saw blade a distance sufficient to complete removal of the piece from the work, the second motor is energized in the opposite direction to return the work carrier to the home position, said work carrier energizing said mechanical blade-moving means in its beginning movement in the opposite direction to move the movable blade supports thereby moving the saw blade out of the cutting plane to clear the work as the work carrier is returned past the blade to the home position, said work carrier further engaging the mechanical blade-moving means in the home position at the end of its return movement to move the movable blade supports and saw blade back into the cutting place in position for cutting, and fourth to deenergize the second motor and energize the first motor to drive the work transversely past the cutting plane of the saw blade and position it parallel to the cutting plane of the saw blade in position to repeat the cycle.

11. The system of claim 10 wherein the upper blade wheel is carried on a axle carried by a lver-activated mechanicam mounted to said frame, said mechanism including a spring carried between said axle and said lever and a bolt carried between said spring and said lever to tension said spring whereby adjustment of said bolt permits said spring to impose a constant force on said axle when said lever is in the operating position and whereby movement of said lever from the operating position moves said upper blade wheel downwardly sufficiently to permit replacement of the saw blade.

12. The system of claim 10 wherein said work carrier carries a work-engaging means including a sharpened member that is urged by spring means of said work-engaging means to cut into and engage said work, said work-engaging means being engaged by a dog on said frame to pull it from engagement with said work when said work carrier is in the home position, said spring means urging the sharpened member into engagement with the work as the work carrier moves away from the home position and drives the work past the saw blades.

13. The system of claim 10 and further including a movable fence adjustably carried by the frame adjacent the work-supporting and -drivingn surface of the work carrier so that it may define a plane at a variable distance from the cutting plane of the saw blade, said movable fence being engageable with switch means connected into said control whereby upon engagement of said movable fence means by work driven into the fence by said work-supporting and -driving surface, said movable fence engages said switch means when said work is parallel to the cutting plane of the saw blade and said switch means operates the drive means of said reciprocating chain for said work carrier.

14. A band-saw cutting system, comprising:
first means for driving a flexible, band-saw blade in a cutting plane;
second means for supporting and driving work to be cut by said saw blade into a plurality of pieces, said second means including a work carrier for carrying said work and means for reciprocating said work carrier and said work carried thereby in a direction parallel to said cutting plane of said blade from a home position to a forward position for cutting said work, and to return said work from said forward position back to said home position, said work carrier including means for moving said work transversely thereon substantially perpendicular to said cutting plane for positioning said work relative to said cutting plane;
third means for moving said flexible saw blade into and out of said cutting plane, said third means including means for positioning said saw blade in said cutting plane for cutting said work as said reciprocating means moves said work from said home position to said forward position and for positioning said saw blade out of said cutting plane as said reciprocating means returns said work from said forward position to said home position so that said work will not contact said saw blade as it moves from said forward position to said home position;
a spring-biased, sharpened member for engaging said work during the reciprocation of said work to help prevent movement of said work on said work carrier during movement of said work from said home position to said forward position and from said forward position to said home position; and
means for automatically disengaging said sharpened member from said work during transverse movement of said work by said transverse work-moving means.

15. A band-saw-cutting system of claim 14 wherein said spring-biased, sharpened member is carried by said work carrier and includes a poriton that is operated by said system with the work carrier in the home position to disengage the spring-biased, sharpened member from the work while the work carrier is in the home position.

16. The band-saw-cutting system of claim 15 wherein said work carrier is adopted to automatically operate the means for moving the work transversely on the work carrier when the work carrier reaches the home position.

* * * * *

UNITED STATES PATENT AND TRADEMARK OFFICE
CERTIFICATE OF CORRECTION

PATENT NO. : 4,702,137

DATED : October 27, 1987

INVENTOR(S) : DELMA DAVIDSON and THOMAS R. WAECHTER

It is certified that error appears in the above-identified patent and that said Letters Patent is hereby corrected as shown below:

In col. 6, line 12, delete "respective" and insert -- respectively -- therefor; line 16 delete "for" (second occurrence).

In col. 14, line 31 (claim 2, line 6) after "and", insert -- a --.

In col. 15, line 6 (claim 10, line 6), delete "drien" and insert -- driven -- therefor.

In col. 16, line 8 (claim 10, line 76), after "first", add -- , -- (a comma); line 16 (claim 10, line 84), delete "driving" and insert -- drive -- therefor; line 41 (claim 11, line 2) delete "a" (first occurrence) and insert -- an -- therefor; line 41 (claim 11, line 2) delete "lver" and insert -- lever -- therefor; line 63 (claim 13, line 3) delete "-drivingn" and insert -- -driving -- therefor.

In col. 18, line 23 (claim 16, line 2), delete "adopted" and insert -- adapted -- therefor.

Signed and Sealed this

Thirty-first Day of May, 1988

*Attest:*

DONALD J. QUIGG

*Attesting Officer*   *Commissioner of Patents and Trademarks*